United States Patent [19]
Alpert et al.

[11] Patent Number: 5,559,986
[45] Date of Patent: Sep. 24, 1996

[54] INTERLEAVED CACHE FOR MULTIPLE ACCESSES PER CLOCK CYCLE IN A MICROPROCESSOR

[75] Inventors: Donald B. Alpert, Santa Clara; Mustafiz R. Choudhury, Sunnyvale; Jack D. Mills, Mountain View, all of Calif.

[73] Assignee: Intel Corporation, Santa Clara, Calif.

[21] Appl. No.: 191,052

[22] Filed: Feb. 2, 1994

Related U.S. Application Data

[63] Continuation of Ser. No. 813,378, Dec. 23, 1991, abandoned.

[51] Int. Cl.$^6$ .................................................. G06F 12/08
[52] U.S. Cl. .................. 395/471; 395/484; 395/454; 395/457; 364/DIG. 1
[58] Field of Search ................................. 395/425, 325, 395/452, 484, 471, 454, 457, 478; 364/DIG. 1

[56] References Cited

U.S. PATENT DOCUMENTS

| | | | |
|---|---|---|---|
| 4,783,736 | 11/1988 | Ziegler et al. | 395/457 |
| 4,794,521 | 12/1988 | Ziegler et al. | 395/457 |
| 4,833,599 | 5/1989 | Colwell et al. | 395/650 |
| 4,933,846 | 6/1990 | Humphrey et al. | 395/287 |
| 5,043,874 | 8/1991 | Gagliardo et al. | 395/478 |
| 5,168,547 | 12/1992 | Miller et al. | 395/821 |
| 5,179,680 | 1/1993 | Colwell et al. | 395/452 |

*Primary Examiner*—Tod R. Swann
*Assistant Examiner*—James Peikari
*Attorney, Agent, or Firm*—Blakely, Sokoloff, Taylor & Zafman

[57] ABSTRACT

An interleaved cache is used for multiple data accesses per clock in a microprocessor. The cache includes a storage array having multiple banks of single-ported memory cells for storing data, a bank selector for selecting banks in the storage array simultaneously according to the multiple data accesses, and a datapath for transfering data between execution units in the microprocessor and the storage array. The cache of the present invention also includes contention logic for prioritizing the multiple data accesses when multiple data accesses are to be same bank.

23 Claims, 3 Drawing Sheets

FIG_1
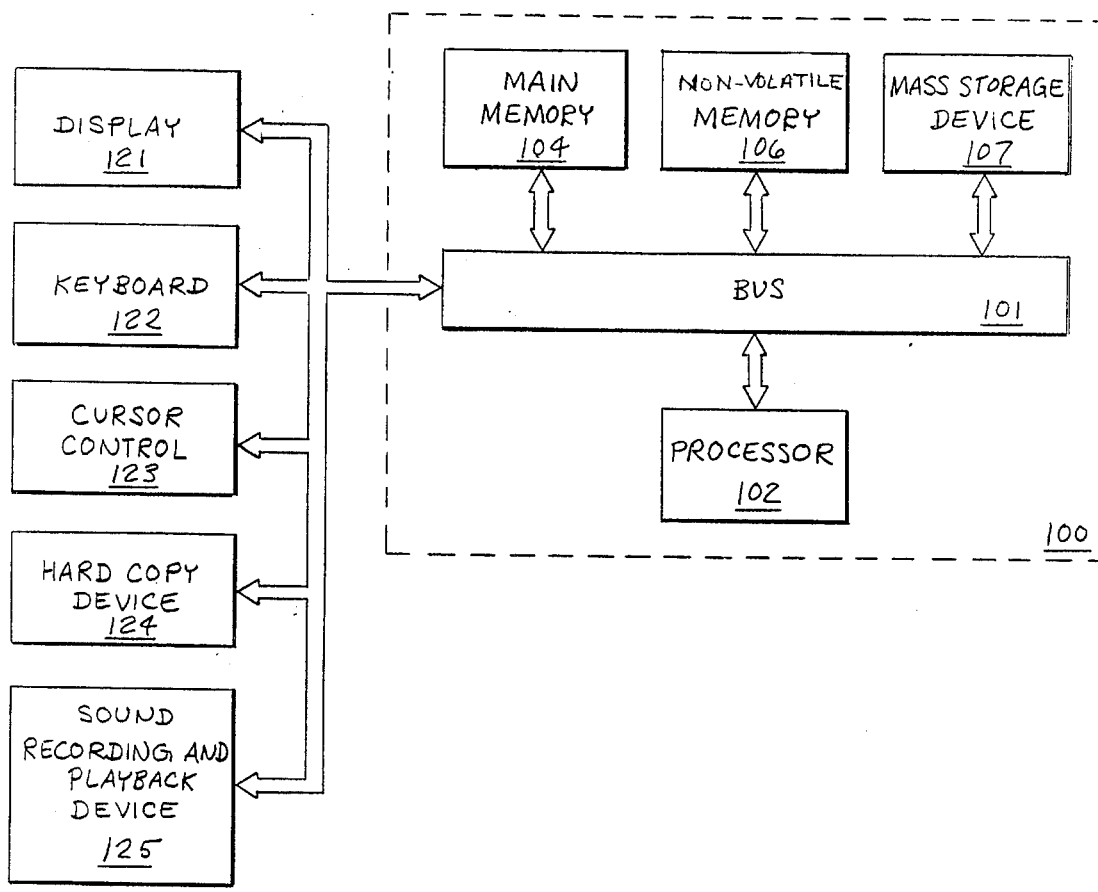
FIG_2
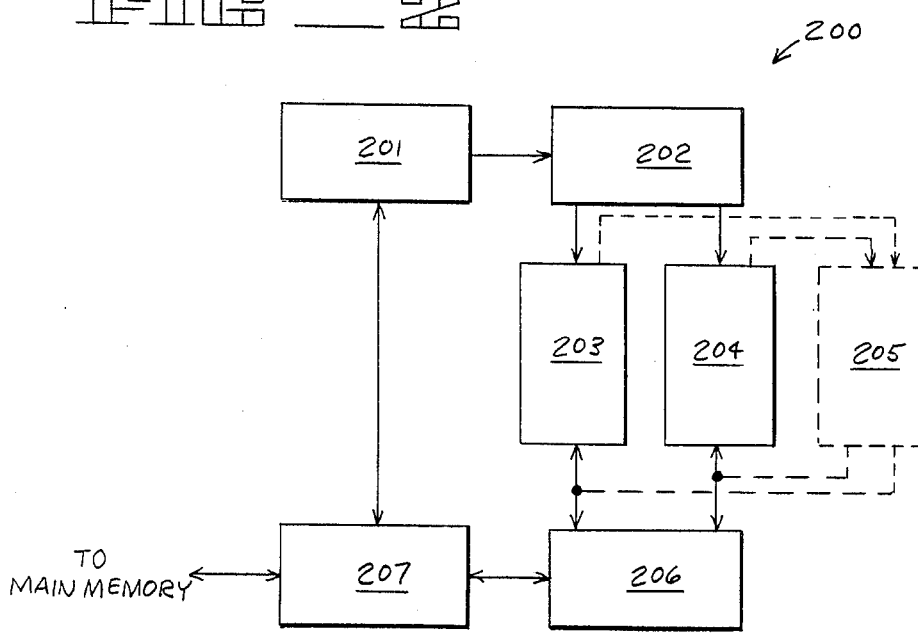

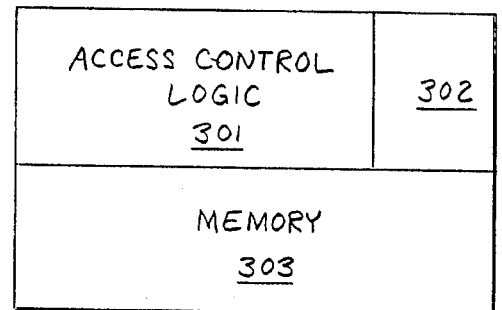
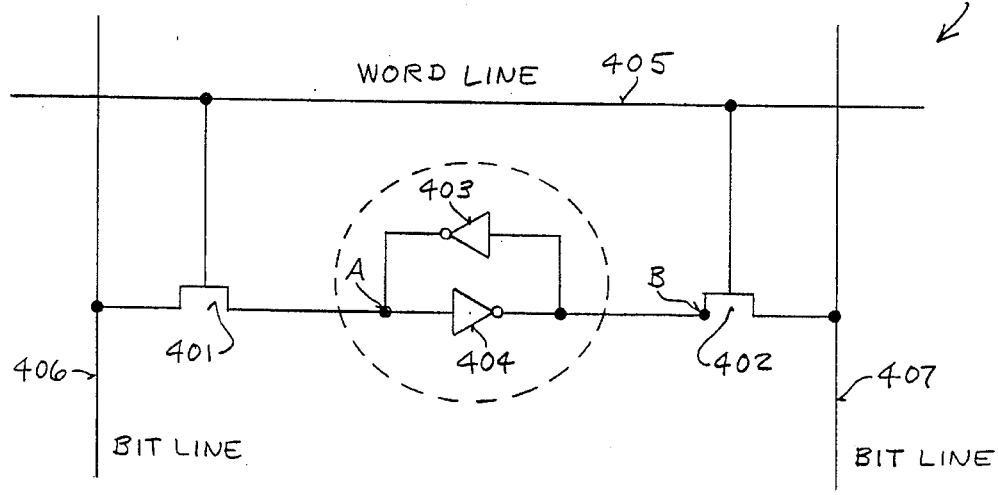

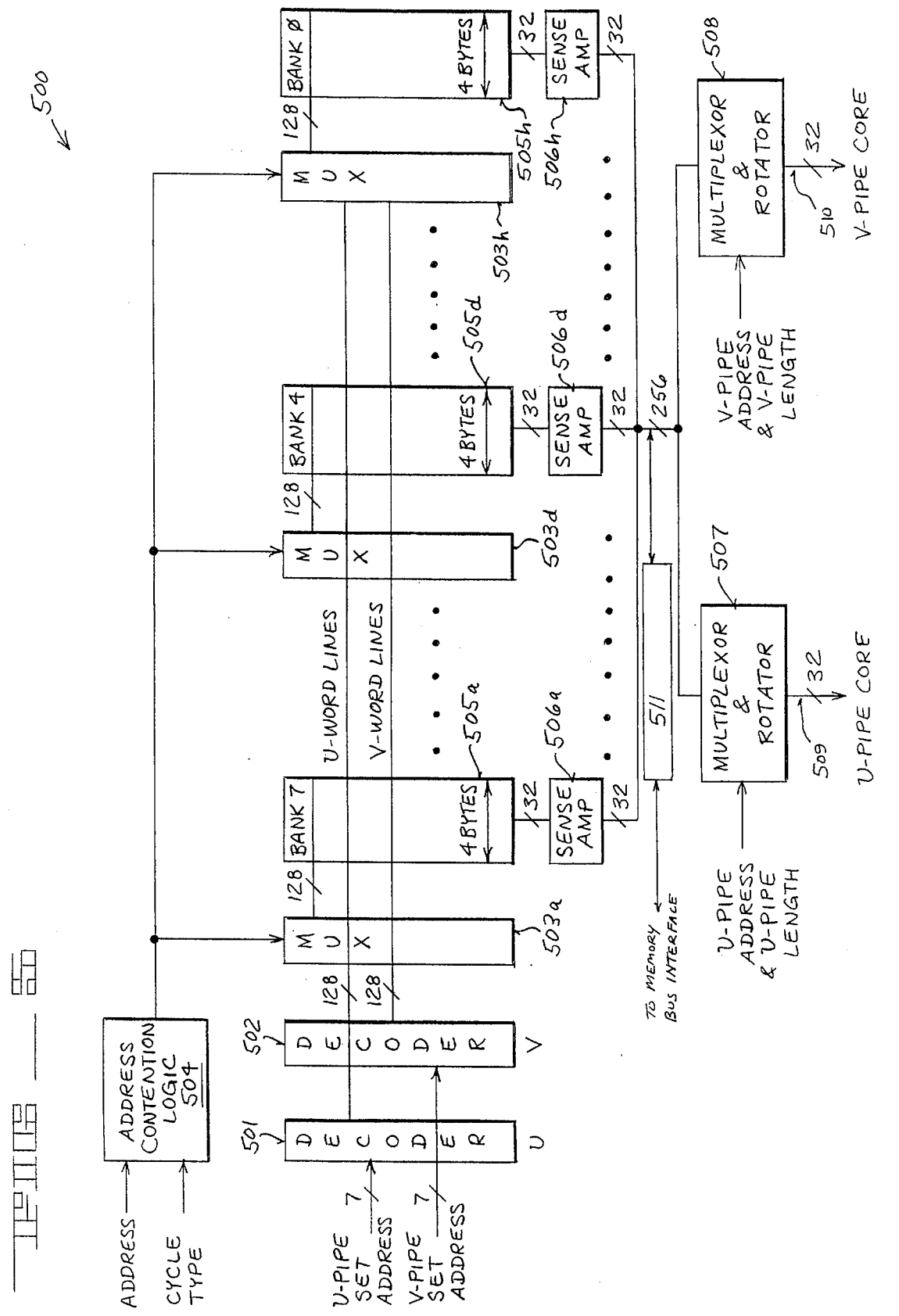

INTERLEAVED CACHE FOR MULTIPLE ACCESSES PER CLOCK CYCLE IN A MICROPROCESSOR

This is a continuation of application Ser. No. 07/813,378, filed Dec. 23, 1991, now abandoned.

FIELD OF THE INVENTION

The present invention relates to the field of microprocessors; specifically, to interleaved cache memories representing a level of the memory hierarchy between the central processing unit (CPU) and the main memory.

BACKGROUND OF THE INVENTION

Throughout the development of computer systems, a primary emphasis has been on increasing the speed of such systems and their ability to handle larger and more complicated programs while reducing their cost. In order to increase the ability of a computer system, it is necessary to both increase the size of the random access memory (RAM) so that larger programs may be utilized by the computer system and to increase the speed at which access to that RAM is afforded. The straightforward method of increasing access speed is to use components which operate more quickly. However, such rapidly-operating components are more expensive than slower memory components.

Due to the cost involved in providing high speed RAM, advanced computer systems have used high-speed caching arrangements to increase the operational speed of the memory system. A caching arrangement provides a small portion of especially fast memory in addition to the regular RAM. As commands are issued and data is utilized, the information is called from RAM and stored in this cache memory. As each new read or write command is issued, the system looks to the fast memory cache to determine if the information is stored in the cache. If the information is available in the cache memory, access to the RAM is not required and the command may be processed or the data accessed much more rapidly. If the information is not available in the cache memory, then new data may be copied from the main memory and stored in the cache memory where it can be accessed and remains ready for later use by the system. In well-designed memory systems, the information sought lies in the cache memory over 90% of the time on an average. Consequently, use of the cache memory substantially speeds the overall operation of the memory utilized in a computer system.

In order to further enhance the speed of operation of computer systems, it has been found desirable to directly associate a small portion of extremely rapid cache memory directly on a processor chip. For example, it may be useful to provide such a small fast cache memory consisting of 8 Kbytes of memory directly on the chip with the other elements of a CPU. Such an arrangement is capable of greatly increasing the speed of the operation of the system to a great degree for information which is used repeatedly by various processes.

Typically, static memories, such as static random access memories (SRAM) are used for cache memories. These memories are fabricated from a plurality of bistable circuits (flip-flops), each forming a cell for storing one bit of data. In the memory array, bit lines are used to read data from the cells. These bit lines are also used during writing by driving the lines to the desired state as determined by the incoming data.

Another approach for achieving high performance in microprocessors is to execute multiple instructions per clock, typically referred to as superscalar. In order to effectively execute multiple instructions per clock, the microprocessor must prevent availability of operands from being the bottleneck during the execution stages. For instance, where multiple operands need to access the on-chip data cache, a bottleneck may occur. Thus, a microprocessor needs a data cache which is able to accommodate simultaneous multiple data references per clock. In the prior art, to accommodate multiple data references, a multi-ported scheme is normally employed. Under such a scheme, a multi-ported memory cell having as many ports as the number of simultaneous data references is used.

Dual port static memory cells are also known in the prior art. In example of one such cell is shown in U.S. Pat. No. 4,823,314. The dual-ported memory cell is often used to accommodate multiple data references to a memory. However, the dual-ported RAM cell requires two more transistors than a six transistor single-ported SRAM cell, two pairs of bit lines and two word lines. Furthermore, the transistors for the cross-coupled inverters in the dual-ported cell need to be larger to drive the larger load off the extra pair of bit lines. In comparison, the dual-ported SRAM is found to be much larger than a single-ported cell, approximately 1.7 times the size of the single-ported cell. Moreover, the dual-ported scheme requires twice the number of sense amplifiers that a single-ported scheme would require. The dual-ported non-interleaved scheme would also burn twice as much power as a typical single-ported cache because of twice the number of sense amplifiers would be enabled during an access to the cache.

Another method utilized to improve memory access times is through optimizing the memory organization. Memories can be organized in banks such that reading or writing multiple words can occur at one time, instead of just a single word. These banks are typically one word wide so that the width of the bus and the cache need not change. Thus, by sending addresses to multiple banks, the cache can read multiple references simultaneously. Banks are also valuable on write operations. While back-to-back writes would normally have to wait for earlier write operations to be completed, a multiple bank organization allows multiple writes per clock, provided that these writes are not destined for the same bank.

In the prior art, multiple memory controllers are employed to control the access to the cache memory banks. A memory controller was associated with each memory bank. The multiple memory controllers allow banks to operate independently. For instance, an input device may use one controller and its memory, the cache may use another, and a vector unit may utilize a third. The number of controllers actually used is usually small in number. In such a cache memory system, if the number of controllers is low, the possibility of a conflict between memory references competing for the same bank is greater. Therefore to reduce chances of conflicts, many banks are needed.

As will be seen, the present invention provides a single-ported cache memory which can accommodate multiple data references per clock cycle in a microprocessor. The multiple data accesses per clock are made possible because the data cache of the present invention is interleaved.

SUMMARY OF THE INVENTION

An interleaved cache for multiple data accesses per clock in a microprocessor is described. The cache includes a storage array having multiple banks of single-ported memory cells. In the currently preferred embodiment, the cache has eight banks of memory. The cache also includes a bank selector mechanism and a datapath. The bank selector mechanism allows for multiple bank accesses per clock by the multiple execution units of the microprocessor. The datapath provides a databus between the storage array and the execution units of the microprocessor.

In the present invention, the bank selector mechanism includes decoding logic and bank controller logic. The decoding logic decodes the addresses of the multiple data accesses. In the currently preferred embodiment, the decoding logic is a set of decoders. The bank controller logic accesses locations in the banks in response to the decoded addresses from the decoding logic. In the currently preferred embodiment, the bank controller logic is a set of multiplexers.

In the present invention, the datapath includes multiple data ports and a datapath controller. In the currently preferred embodiment, the number of data ports is equal to the number of execution units in the microprocessor. The datapath controller controls the transfer of data between the execution units and the storage array of the cache of the present invention, such that multiple execution units access the storage array per clock. The datapath controller includes alignment logic for aligning the data for each of the execution units according to its data access request. In the currently preferred embodiment, a datapath controller consisting of a multiplexer and a rotator coupled to each port and controls the transfer of data to and from each execution unit in the microprocessor.

The present invention further includes contention logic which determines if multiple data accesses to the same bank in the storage array occur. When this happens, the contention logic prioritizes the contending multiple data accesses, such that they can be satisfied. In the currently preferred embodiment, the contention logic receives the cycle type and the addresses corresponding to the multiple data accesses and signals the bank selectors to permit the data access to a specific bank of the storage array. The signals sent to the bank selectors are inputs and control signals to the multiplexers in the currently preferred embodiment. In the present invention, the contention logic allows only one of the data accesses to occur, thereby preventing all others, when that data access is a replacement (e.g., read, write, etc.), testability, or an invalidation cycle.

The storage array of the present invention uses sensing circuitry to read out the data from the array during the multiple data accesses. The sensing circuitry includes a sense amplifier associated with each bank in the storage array. Under the present invention, only the sense amplifiers associated with the memory bank being accessed are enabled. In this manner, the power consumed by the storage array is reduced.

BRIEF DESCRIPTION OF DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of the computer system of the present invention.

FIG. 2 is a block diagram of the microprocessor of the present invention.

FIG. 3 is a block diagram of the cache of the present invention.

FIG. 4 illustrates the currently preferred embodiment of a static random access memory (SRAM) cell of the memory array of the present invention.

FIG. 5 is a block diagram of the currently preferred embodiment of the present invention.

DETAILED DESCRIPTION OF THE INVENTION

An interleaved data cache allowing multiple data accesses per clock in a microprocessor is described. In the following description, numerous specific details are set forth, such as specific numbers of bytes, bits, devices, etc., in order to provide a thorough understanding of the preferred embodiment of the present invention. It will be obvious to one skilled in the art that the present invention may be practiced without these specific details. Also, well known circuits have been shown in block diagram form, rather than in detail, in order to avoid unnecessarily obscuring the present invention.

In the course of describing the present invention, frequent reference may be made to the use of the interleaved data cache in conjunction with certain specific CPU architectures and/or microprocessor types, such as the Intel i586™ and i860XP™ microprocessors. These implementations merely reflect the currently preferred embodiment of the present invention. It should be understood that the concepts embodied in the present invention are applicable, or may be extended to other processor types and architectures.

In addition, in describing the present invention, reference is made to signal names peculiar to the currently preferred embodiment. Reference to these specific signal names should not be construed as a limitation on the spirit or scope of the present invention.

Overview of the Computer System of the Present Invention

Referring to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communication means 101 for communicating information, a processing means 102 coupled with bus 101 for processing information, a Random Access Memory (RAM) or other dynamic storage device 104 (commonly referred to as a main memory) coupled with bus 101 for storing information and instructions for processing means 102, a Read Only Memory (ROM) or other non-volatile storage device 106 coupled with bus 101 for storing non-volatile information and instructions for processing means 102, a data storage device 107, such as a magnetic disk and disk drive, coupled with bus 101 for storing information and instructions, a display device 121, such as a cathode ray tube, liquid crystal display, etc., coupled to bus 101 for displaying information to the computer user, an alpha-numeric input device 122 including alpha-numeric and other keys, etc., coupled to bus 101 for communicating information and command selections to processor 102 and a cursor control 123 for controlling cursor movement. The system also includes a hard copy device 124, such as a plotter or printer, for providing a visual representation of the computer images. Hard copy device 124 is coupled with processor 102, main memory 104, non-volatile memory 106 and mass storage device 107 through bus 101. Finally, the system includes a sound recording and playback device 125 for providing audio recording and playback.

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Microprocessor

FIG. 2 depicts a block diagram of microprocessor 200 of the present invention. In the currently preferred embodiment, microprocessor 200 is an Intel i586™ superscaler microprocessor capable of executing multiple instructions at once. Referring to FIG. 2, microprocessor 200 generally comprises a prefetcher or instruction cache means 201 for prefetching instructions from main memory to be executed by a microprocessor 200 and an instruction decoder 202 coupled with prefetcher 201 for decoding the instructions fetched by prefetcher 201. Decoder 202 is also coupled with two execution pipeline units, 203 and 204, one called the "u-pipe" and the other called the "v-pipe" respectively. Decoder 202 supplies both u-pipe 203 and v-pipe 204 with decoded instructions simultaneously. In the currently preferred embodiment, u-pipe 203 and v-pipe 204 are integer pipelines, together capable of executing two integer instructions in each clock cycle. To do so, each pipeline, u-pipe 203 and v-pipe 204, contains its own set of address generation logic, arithmetic logic and cache memory interfaces. The currently preferred embodiment also contains a floating-point (FP) execution pipeline 205 coupled with u-pipe 203 and v-pipe 204 for receiving decoded floating-point instructions from decoder 202 via u-pipe 203 and v-pipe 204 and executing those instructions. FP execution pipeline 205 also has its own arithmetic logic and memory interface. The memory interface of execution pipelines 203–205 are all coupled with data cache 206.

The cache memory interfaces consist of memory buses which are coupled to data cache 206. The memory buses are typically either 32, 64 or 128-bits wide. The datapath widths of the Intel 80586 microprocessor are 32-bits wide. Execution pipelines 203–205 use the cache memory interface to access data cache 206 for recently used data which data cache 206 temporarily stores until the data is written back to memory. Data cache 206 is also coupled with memory bus interface 207. Bus interface allows both prefetcher 201 and data cache 206 to access main memory (FIG. 1).

U-pipe 203 and v-pipe 204, as well as FP pipeline 205, execute instructions at the same time. The execution of these instructions by u-pipe 203 and v-pipe 204 require accesses to data, referred to as data references. These data references are satisfied by data in data cache 206 or data in main memory should the required data not be in data cache 206.

In the currently preferred embodiment, u-pipe 203 and v-pipe 204 can access data cache 206 simultaneously, such that data cache 206 satisfies multiple data references per clock. These accesses could be data cache reads or write operations.

Of course, certain implementations and uses of the present invention may not require nor include all or be limited solely to the above components. For example, in certain implementations, microprocessor 200 would have many more execution pipelines. If this were the case, data cache 206 of the present invention would still allow all of the execution pipelines access to data cache 206 during the same clock. Thus, the present invention is not limited to two simultaneous data accesses per clock nor is it required to have the same number of data references as execution pipelines.

Overview of the Cache Memory

The data cache of the present invention is shown in block diagram form in FIG. 3 as data cache 300. Data cache 300 contains copies of recently accessed areas of main memory (FIG. 1). Use of data cache 300 is based on the principle of locality. This principal recognizes that if an item is referenced, it will tend to be referenced again soon afterwards (i.e., locality in time). Likewise, if an item is referenced, nearby items will tend to be referenced soon thereafter (i.e., locality in space). Thus, the rationale of using a cache memory is to provide efficient access to frequently used information, thereby accelerating processing speed. Data cache 300 comprises access control logic 301, tag validation and verification block 302, data cache memory 303 and datapath 304. In the currently preferred embodiment, data cache 300 is a two-way set associative cache organized as 128 sets, each set containing two lines. Each line contains 32 bytes of data. The capacity of data cache 300 is 8 Kbytes of data.

In order to accommodate multiple data references simultaneously per clock, data cache memory 300 is interleaved. The interleaved scheme, however, involves splitting cache memory 303 into N "banks" (where N is an integer which is a power of 2 and is split at a selected address boundary). Each of the banks are independently addressable. Even though cache memory 303 is a single-ported memory array, multiple data references access the banks so long as multiple data references do not attempt to access the same bank. Each bank contains M bytes of data for every cache line. The number of bytes in each bank determines the number of banks for a given cache line size or vice versa. In the currently preferred embodiment, data cache 300 accommodates two simultaneous data references and has a cache line size of 32 bytes. Furthermore, the interleaving boundary is a 4-byte boundary. Thus, data cache 300 is eight-way interleaved (i.e., eight banks) in the currently preferred embodiment.

Access control logic 301 allows a continuous rate of multiple data references to access memory 303 per clock. In the current preferred embodiment, data cache 300 supports two data references, one each from two integer instruction execution pipelines, the u-pipe and the v-pipe (FIG. 2). Secondly, access control logic 301 also detects when multiple data references wish to access the same bank of memory 303 during the same cycle (e.g., concurrent u-pipe memory and v-pipe memory reads to the same location). In response to such data requests, access control logic 301 prioritizes the data accesses and permits them to occur serially. In the currently preferred embodiment, access control logic 301 comprises address comparators which detect address collisions to the same bank.

Tag validation and verification block 302 determines if the data requested is currently in cache memory 303. If the data is present in cache memory 303, then there is a cache hit and the data is accessed. If the data is not present in the cache, referred to as a cache miss, the data must be fetched from main memory (FIG. 1) by data cache 300. In the currently preferred embodiment, this determination is accomplished using well-known tag manipulation methods.

Datapath 304 provides a bus for data accessed from cache memory 303 between the execution pipes, u and v, and cache memory 303. In the currently preferred embodiment, datapath 304 has logic to accommodate accesses to misaligned addresses (i.e., split cycles).

Finally, in the currently preferred embodiment, data cache 300 is a writeback cache with full support for multi-processing consistency. This is accomplished by data cache 300 maintaining the ownership protocol and state used by the microprocessor (FIG. 2). Although the preferred embodiment of data cache 300 is a writeback cache, it can be configured as a write-through cache on a line by line basis.

In the currently preferred embodiment, the memory cells of cache 303 are fabricated using well-known complementary metal-oxide-semiconductor (CMOS) processing. In the drawings, the p-channel field-effect transistors are designed by the use of a small circle above the transistors gate; The n-channel field-effect transistors are identified by the absence of the circle above the gate. The memory employs ordinary bistable (flip-flop) cells.

Referring to FIG. 4, the typical single memory cell of the currently preferred embodiment is shown as CMOS static ram cell 400. Cell 400 is a typical six transistor static RAM (SRAM) cell. However, the present invention is not limited to a six transistor SRAM cell. For instance, the current four transistor SRAM cells can be utilized. The SRAM cell 400 is replicated thousands of times and is the primary determinant of the die area that has to be dedicated to the data cache 303 or the cache size that can be accommodated within a fixed area. Referring to FIG. 4, one terminal n-channel transistor 401 is coupled to bit line 406. The gate of transistor 401 is coupled to word line 405. The other terminal of transistor 401 is coupled to node A. One terminal of n-channel transistor 402 is coupled to bit line 407. The gate of transistor 402 is coupled to word line 405. The other terminal of transistor 402 is coupled to node B. Inverters 403 and 404 are cross-coupled. The input of inverter 403 is coupled to node B. The output of inverter 403 is coupled to node A. The input and output of inverter 404 are coupled to node A and node B respectively. Transistors 401 and 402 act as pass transistors. In the currently preferred embodiment, inverters 403 and 404 are both pairs of complementary p-channel and n-channel transistors and form the storage element of SRAM cell 400. The structure and operation of SRAM cell 400 is well known in the art.

FIG. 5 shows the currently preferred embodiment of the single-ported interleaved data cache 500 of the present invention in block diagram form. Referring to FIG. 5, the decoder 501 receives a u-pipe set address on its input. In the currently preferred embodiment, the u-pipe set address is 7-bits long. The output of decoder 501 is coupled to one of the inputs of each of multiplexers (MUXs) 503a–503h. The input of decoder 502 is coupled to the v-pipe set address. In the currently preferred embodiment, the v-pipe set address is 7-bits long. The output of decoder 502 is coupled to one of the other input of each of MUXs 503a–503h. The outputs of MUXs 503a–503h are coupled to the inputs of memory banks 505a–505h respectively. Address contention logic 504 is coupled to an input of MUXs 503a–503h. Sense amplifiers 506a–506h are coupled to memory banks 505a–505h respectively. The output of sense amplifiers 506a–506h are coupled to multiplexer/rotator 507 and multiplexer/rotator 508. In the currently preferred embodiment, multiplexor/rotators 507 and 508 are coupled to sense amplifiers 506a–506h using a 256-bit bus. Each multiplexer/rotator in data cache 500 comprises a multiplexer and a rotator. The outputs of multiplexer/rotators 507 and 508 are coupled to the u-pipe and v-pipe execution cores respectively using buses 509 and 510 respectively. In the currently preferred embodiment, buses 509 and 510 are each 32-bit buses. The output of sense amplifiers 506a–506h are also coupled to writeback and fill buffers 511. In the currently preferred embodiment, writeback and fill buffers 511 are coupled to the 256-bit bus. Writeback and full buffers 511 is also coupled to the memory bus interface (FIG. 2).

For a read operation, the two sets of decoders, decoders 501 and 502, receive the u-pipe and the v-pipe addresses respectively. These addresses correspond to data references within cache 500. Decoders 501 and 502 decode the addresses to obtain the set location. In the currently preferred embodiment, the set address can be any one of 128 sets. The two set addresses can be to the same set, even to the same bank, in data cache 500. Both decoded set addresses are sent to every multiplexer. In the currently preferred embodiment, the decoded address are sent to MUXs 503a–503h. Each of MUXs 503a–503h is a set of multiplexers. The outputs of MUXs 503a–503h are coupled to the wordlines of each set in the memory banks 505a–505h respectively and are the wordline drivers for the SRAM cells in each of the banks and are required for each of the independently addressable banks. Thus, MUXs 503a–503h drive the decoded set addresses onto the wordlines of memory banks 505a–505h respectively. The multiplexer delay associated with MUXs 503a–503h has minimal impact on the access time of cache 500. MUXs 503a–503h only drive the set addresses onto the wordlines in response to a select signal from address contention logic 504.

Address contention logic 504 determines if a conflict exists between the u-pipe and v-pipe addresses. A conflict exists where multiple data references are to the same bank. The address contention logic 504 receives the addresses and the cycle type (e.g., read, write, etc.) and compares the addresses. In the currently preferred embodiment, address contention logic 504 comprises a comparator which compares the lower address bits 2–4. If a conflict does not exist, then address contention logic 504 selects the appropriate MUX 503a–503h thereby allowing the selected multiplexer to drive the address onto the wordlines. If a conflict does arise, address contention logic 504 prioritizes the conflicting multiple data references. Address contention logic 504 can implement any priority scheme defined by the architecture and by the order or interaction. In the currently preferred embodiment, address contention logic 504 holds up the v-pipe data reference to enable the u-pipe data reference to be satisfied first. The v-pipe data reference is then satisfied during the next cycle. This scheme essentially serializes the conflicting multiple data references. Therefore, in the currently preferred embodiment, address contention logic 504 serializes conflicting multiple data references to the same memory bank by prioritizing them.

A conflict also arises during replacement, testability, and invalidation cycles. During all of these cycles, an entire cache line is read out or written into data cache 500 through writeback and fill buffers 511. The operation of writeback and fill buffers 511 in completing the replacement, testability and invalidation cycles is well-known in the art. In any of these cycles, address contention logic 504 only permits one of the execution pipelines (e.g. u-pipe or v-pipe) to access all memory banks 505a–505h.

Once a multiplexer has been selected, the appropriate wordline in the bank is turned on. Thus, where multiple data references are allowed by address contention logic 504, wordlines in multiple banks are turned on. Each selected bank is unaware of the source of its data access. The data from each selected bank is then read out on a 32-bit bus and is sensed by its respective sense amplifier. Since each bank is addressed independently, sense amplifiers 506a–506h are enabled selectively to only sense the data of the banks being accessed. This reduces the power consumption by the memory array. The sensed data is output from sense amplifiers 506a–506h to a 256-bit datapath coupled to multiplexer/rotators 507 and 508. The sensed data then fans out to multiplexer/rotators 507 and 508. It should be noted that each of multiplexer/rotators 507 and 508 in cache 500 receives all the sensed data from all of the accessed banks during the clock cycle.

Multiplexer/rotator 507 also receives the u-pipe address and u-pipe data length. Multiplexer/rotator 508 also receives the v-pipe address and the v-pipe data length. The data lengths indicate the amount of data to be fetched. These addresses and data lengths control the outputs of multiplexer/rotators 507 and 508, such that multiplexer/rotator 507 selects the data associated with the u-pipe address and multiplexer/rotator 508 selects the data associated with the v-pipe address.

In the currently preferred embodiment, the multiplexors of multiplexor/rotators 507 and 508 are 8 to 1 multiplexors. In the currently preferred embodiment, the rotators of multiplexer/rotators 507 and 508 align the data before the data is sent to the processor core. The rotators of multiplexor/rotators 507 and 508 provide the least significant byte of the data item requested on the least significant byte of buses 509 and 510. The operation of rotators is well-known in the art.

Once multiplexer/rotators 507 and 508 select the appropriate data and any required rotation has been performed, the data is sent to its execution pipe, u or v, on buses 509 and 510, respectively, for use.

During a write operation, cache 500 functions similarly to the read operation except the path of the data is reversed. The data comes in through multiplexer/rotators 507 and 508 to memory banks 505a–505h. The destination set addresses are decoded by decoders 501 and 502 and the decoded addresses are output to MUXs 503a–503h. Wordlines for the selected memory banks are turned on due to its selection by address contention logic 504. In response to the wordline being turned on, the data is written into data cache 500 in a manner well-known in the art.

The present invention provides the advantage over prior art interleaved caches by not always requiring that an entire cache line be read from or written to the cache at any one time. This allows multiple accesses to the same cache line, although the banks must be different. In this manner, there is a lesser chance for data conflicts to arise.

In the currently preferred embodiment, an interleaved cache was implemented to service two simultaneous data references per clock. An 8-way interleaved cache was chosen over 2-way or 4-way interleaving because performance loss due to bank contention was less. Moreover, the 8-way interleaved cache simplified the design, given the four byte interleaving boundary and the 32 byte line size. Less hardware was also required in comparison to a 16-way or greater interleaved cache.

The present invention provides an advantage over prior art dual-ported caches. A dual-ported cache requires dependancy logic to detect simultaneous reads and writes to the same address. This is not necessary with the interleaved cache where bank the bank conflict logic avoids the case of references to the same location with simpler logic than dual-ported schemes.

The interleaved scheme of the present invention also provides a benefit over dual-ported schemes in that the interleaved cache of the present invention can store more data in the same silicon area, thereby reducing the number of off-chip data references.

Whereas many alterations and modifications of the present invention will no doubt become apparent to a person of ordinary skill in the art after having read the foregoing description, it is understood that the particular embodiment shown and described by illustration are in no way intended to be limiting. For instance, the storage array of the data cache of the present invention could have been divided into any number of banks. Therefore, reference to the details of the preferred embodiments are not intended to limit the scope of the claims which themselves recite only those features regarded as essential to the invention.

Thus, an interleaved cache allowing multiple data accesses per clock in a microprocessor has been described.

We claim:

1. An on chip cache memory for use in a microprocessor, wherein the microprocessor includes a plurality of execution units for executing a plurality of instructions, wherein a plurality of simultaneous data accesses are required for the execution of said plurality of instructions, each of said plurality of data accesses being independently addressable, said cache memory comprising:

a single-ported interleaved storage array comprising a plurality of banks of single-ported memory cells, wherein the storage array stores a plurality of cache lines, wherein a portion of each of the plurality of cache lines is stored in each of the plurality of banks;

access control logic coupled to said storage array, wherein the access control logic receives the plurality of accesses and determines if data corresponding to the plurality of data accesses is present in said interleaved storage array using tag matching, and further wherein said access control logic accesses a plurality of banks in said storage array per clock cycle in response to said plurality of data accesses of said plurality of execution units, wherein the plurality of data accesses are performed by the access control logic in instances where tag matching confirms that data requested by the plurality of data accesses are present in the storage array; and datapath means coupled to said storage array for providing a datapath between said storage array and said plurality of execution units to accommodate said plurality of data accesses, wherein the datapath means directs data corresponding to the plurality of data accesses from said storage array to the plurality of execution units, such that multiple data accesses occur per clock cycle.

2. The cache memory defined in claim 1 wherein each of said multiple data accesses includes an address, and further wherein said access control logic comprises:

a plurality of decoding means for decoding the address of each of said plurality of data accesses; and a plurality of bank selection means responsive to said plurality of decoding means for accessing a location in said storage array, wherein each of said plurality of bank selection means is coupled to one of said banks in said storage array for providing access to said one of said banks.

3. The cache memory as defined in claim 2 wherein said plurality of decoding means comprises a plurality of decoders.

4. The cache memory as defined in claim 2 wherein said plurality of bank selection means comprises a plurality of multiplexers.

5. The cache memory defined in claim 1 wherein said datapath means comprises:

a plurality of datapaths, each of said plurality of datapaths corresponding to one of said execution units; and control means for controlling the transfer of data between said storage array and said plurality of datapaths.

6. The cache memory as defined in claim 5 wherein said control means comprises a plurality of multiplexers.

7. The cache memory defined in claim 1 further comprising contention means responsive to said plurality of data accesses, said contention means for prioritizing said plurality of data accesses, such that when more than one of said plurality of data accesses are to the same bank of said storage array, said contention means prioritizes said plurality of data accesses, such that said more than one of said plurality of accesses occur serially.

8. An interleaved cache memory for use in a microprocessor, wherein the microprocessor includes a plurality of execution units for executing a plurality of instructions per clock cycle, wherein a plurality of simultaneous data accesses to said cache memory are required for the execution of said plurality of instructions according to an access type, each of said plurality of data accesses being independently addressable, said cache memory comprising:

a single-ported interleaved storage array comprising a plurality of banks of single-ported memory cells for storing a plurality of cache lines, each of said cells being independently addressable, wherein a portion of each of the plurality of cache lines is stored in each of the plurality of banks;

access control logic coupled to the storage array, wherein the access control logic determines whether data stored in the locations requested by the plurality of accesses are contained in the storage array using tag matching;

a plurality of decoding means for decoding the address of each of said plurality of data accesses to produce a plurality of decoded addresses;

a plurality of bank selection means coupled to said plurality of decoding means and the storage array, wherein one of said plurality of banks is coupled with one of said plurality of bank selection means, said bank selection means for driving the plurality of decoded addresses onto the plurality of banks of said cells in parallel when the access control logic determines that data stored in the locations requested by the plurality of accesses is contained in the storage array using tag matching; and direction means coupled to said storage array for accommodating the plurality of data accesses, wherein the direction means directs data stored in locations requested by the plurality of data accesses from said storage array to the plurality of execution units, such that data is transferred between said storage array and said plurality of execution units multiple times per clock cycle.

9. The cache memory as defined in claim 8 further comprising contention logic means coupled to said bank selection means and responsive to said access type and said addresses of said plurality of data accesses, said contention logic means for detecting address collisions between addresses of said plurality of data accesses, wherein said contention logic means signals said bank selection means to allow said plurality of data accesses to occur during the same cycle when no address collision is detected and prioritizing said plurality of data accesses when address collision is detected, such that multiple cycles are required to compete said plurality of data accesses to the same bank of said storage array when an address collision occurs.

10. The cache memory as defined in claim 8 wherein each of the plurality of execution units receives the data from the direction means on a bus, and said direction means further comprises alignment means for aligning the data onto the bus of each of the plurality of execution units during said plurality of data accesses, such that the least significant byte of data corresponding to each of the plurality of data accesses is provided on the least signaficant byte of the bus of the one execution unit of the plurality of execution units requesting the data.

11. The cache memory defined in claim 9 wherein said contention logic means allows only one of said plurality of data accesses to access said storage array during replacement and writeback cycles.

12. An interleaved cache memory for use in a microprocessor, wherein the microprocessor includes a plurality of execution units for executing a plurality of instructions per clock cycle, wherein a plurality of simultaneous accesses to said cache memory are made during the execution of said plurality of instructions according to an access type, each of said plurality of data accesses being independently addressable, said cache comprising:

a single-ported interleaved storage array comprising a plurality of banks of single-ported memory cells, each of said cells being independently addressable;

access control logic coupled to the storage array, wherein the access control logic determines whether data stored in locations requested by the plurality of accesses are contained in the storage array using tag matching;

bank selection means coupled to said storage array and responsive to the addresses requested by said plurality of data accesses, said selection means for accessing a plurality of banks in said storage array per clock cycle according to said addresses;

contention logic coupled to said bank selection means for prioritizing said plurality of data accesses, such that when the plurality of data accesses are to the same bank of said storage array, said contention logic prioritizes said plurality of data accesses in order to complete said plurality of data accesses;

a plurality of data ports, each of said plurality of data ports stored in locations requested by one of said plurality of execution units for transferring data between said storage array and said plurality of execution units; and control means for controlling the transfer of data between said storage array and said plurality of data ports, wherein the control means directs data corresponding to the plurality of data accesses from said storage array to the plurality of execution units using said plurality of data ports, such that the plurality of accesses occur in one clock cycle.

13. The cache memory as defined in claim 12 wherein said control means comprises:

alignment means for aligning the data during transfers between said storage array and said plurality of data ports, such that the least significant byte of data corresponding to each of the plurality of data accesses is provided on the least signaficant byte of the bus of the one execution unit of the plurality of execution units requesting the data; and selection means for transferring data during said plurality of data accesses between said storage array and said plurality of execution units, such that the data access of each of said plurality of execution units is performed.

14. The cache memory is defined in claim 13 wherein said control means comprises a plurality of multiplexers and a corresponding plurality of rotators, wherein a one of said plurality of multiplexers and one of said plurality of rotators is associated with each of said plurality of data ports.

15. The cache memory as defined in claim 12 wherein said bank selection means comprises:

a plurality of decoding means for decoding the address of each of said plurality of data accesses; and a plurality of bank selection means responsive to said plurality of decoding means for accessing a location in said storage array, wherein each of said plurality of bank selection means is coupled to one of said banks in said storage array.

16. The cache memory as defined in claim 1 wherein each of said plurality of banks further comprises sensing means which are selectively enabled to sense only the data of the banks being accessed, such that the power consumption is reduced.

17. A microprocessor formed in a single integrated circuit chip for use in a computer system, said microprocessor comprising:

an instruction decoder for receiving and decoding a plurality of instructions to produce a plurality of decoded instructions;

a cache memory for storing data;

a plurality of execution units coupled to said instructions decoder and said cache memory for executing said plurality of decoded instructions, wherein at least two of the plurality of execution units execute a first instruction in said plurality of instructions and a second instruction in said plurality of instructions respectively using a first data access and a second data access to the cache memory respectively, where the first data access includes a first address and the second data access includes a second address;

wherein the cache memory includes a single-ported interleaved storage array having a plurality of banks of single-ported memory cells, wherein each of said cells is independently addressable, wherein the storage array is arranged as a plurality of cache lines, such that each of said plurality of banks includes a predetermined number of bytes of each of said plurality of cache lines, decoding logic coupled to receive the first address for the first data access and the second address for the second data access, wherein the decoding logic decodes the first address and the second address to produce a first set address and a second set address respectively, a bank selection mechanism coupled to receive the first set address and the second set address, and wherein the bank selection mechanism accesses a first bank in said plurality of banks and a second bank in said plurality of banks in parallel during a single clock cycle in response to the first set address and the second set address respectively, a data path coupled to said storage array and the plurality of execution units for transferring data between said storage array and said plurality of execution units in response to said plurality of data accesses, such that a plurality of data accesses occur in said cache memory per clock cycle.

18. The microprocessor defined in claim 17 wherein the first set address and the second set address are the same, such that a plurality of data accesses occur to the same cache line during the single clock cycle.

19. The microprocessor defined in claim 17 wherein the first data access and the second data access have a first access type and a second access type and the bank selection mechanism includes:

a plurality of multiplexers coupled to receive the first set address and the second set address, and control means for controlling the plurality of multiplexers using a plurality of control signals, wherein each of the plurality of control signals is coupled to one of said plurality of multiplexers, and further wherein a first multiplexer of the plurality of multiplexers coupled to a first bank of said plurality of banks is selected in response to the first access type and the first address and a second multiplexer of the plurality of multiplexers coupled to a second bank of the plurality of banks is selected in response to the second access type and the second address, such that the first set address and the second set address respectively are driven to access the first bank of the plurality of banks and the second bank of a plurality of banks respectively.

20. The microprocessor defined in claim 17 wherein the data path includes a plurality of sense amplifiers, wherein each of said plurality of sense amplifiers is coupled to one of said plurality of banks, and wherein each of the plurality of sense amplifiers are selectively enabled to sense only the data of the banks being accessed, such that the power consumption is reduced.

21. The microprocessor defined in claim 17 wherein the data path includes a plurality of multiplexers, wherein each of the plurality of multiplexers is coupled to receive data from each of the plurality of banks during the clock cycle and is coupled to one of the plurality of execution units, and wherein the data path includes a control means for controlling the plurality of multiplexers, such that the plurality of multiplexers transfer data to the plurality of execution units.

22. A computer system comprising:

bus means for transferring data;

memory means for storing data, wherein the memory means is coupled to the bus means;

a processor formed in a single integrated circuit chip for use in a computer system, wherein said processor is coupled to said bus means for executing a plurality of instructions, said processor including:

an instruction decoder for receiving and decoding the plurality of instructions to produce a plurality of decoded instructions;

a cache memory for storing data;

a plurality of execution units coupled to said instructions decoder and said cache memory for executing said plurality of decoded instructions, wherein at least two of the plurality of execution units execute a first instruction in said plurality of instructions and a second instruction in said plurality of instructions respectively using a first data access and a second data access to the cache memory respectively, where the first data access includes a first address and the second data access includes a second address;

wherein the cache memory includes a single-ported interleaved storage array having a plurality of banks of single-ported memory cells for storing a plurality of cache lines, wherein each of said cells is independently addressable, wherein a portion of each of the plurality of cache lines is stored in each of the plurality of banks;

cache management logic coupled to receive the first address and the second address for determining if data corresponding to the first address and the second address is contained in said storage array, such that the memory means is accessed for said data corresponding to said first address if data corresponding to the first address is not contained in the storage array and the memory means is accessed for said data corresponding to said second address if data corresponding to the second address is not contained in the storage array, decoding logic coupled to receive the first address for the first data access and the second address for the second data access, wherein the decoding logic decodes the first address and the second address to produce a first set address and a second set address respectively, a bank selection mechanism coupled to receive the first set address and the second set address, and wherein the bank selection mechanism accesses a first bank in said plurality of banks and a second bank in said plurality of banks during a single clock cycle in response to the first set address and the second set address respectively, a data path coupled to said storage array and the plurality of execution units for transferring data between said storage array and said plurality of execution units in response to said plurality of data accesses, such that a plurality of data accesses occur in said cache memory per clock cycle.

23. The computer system defined in claim 22 wherein the storage array is arranged as a plurality of cache lines, such that each of said plurality of banks includes a predetermined number of bytes of each of said plurality of cache lines, and further wherein the first set address and the second set address are the same, such that a plurality of data accesses occur to the same cache line during the single clock cycle.

\* \* \* \* \*